United States Patent [19]

Filges et al.

[11] Patent Number: 5,120,795
[45] Date of Patent: Jun. 9, 1992

[54] NONAQUEOUS PLASTICS FORMULATIONS

[75] Inventors: Ulrich Filges, Limburgerhof; Oral Aydin, Mannheim; Hermann Anders, Neustadt, all of Fed. Rep. of Germany

[73] Assignee: BASF Aktiengesellschaft, Ludwigshafen, Fed. Rep. of Germany

[21] Appl. No.: 451,187

[22] Filed: Dec. 15, 1989

[30] Foreign Application Priority Data

Jan. 14, 1989 [DE] Fed. Rep. of Germany ....... 3900933

[51] Int. Cl.$^5$ .................. C08L 33/06; C08L 33/14; C08F 265/04; C08F 265/06
[52] U.S. Cl. .................. 525/286; 525/118; 525/119; 525/208; 525/281; 525/913; 524/531; 524/530
[58] Field of Search ............... 525/208, 913, 286, 119

[56] References Cited

U.S. PATENT DOCUMENTS

| | | | |
|---|---|---|---|
| 3,781,380 | 12/1973 | Labana et al. | 525/208 |
| 3,888,943 | 6/1975 | Labana et al. | 525/208 |
| 3,959,405 | 5/1976 | Labana et al. | 525/208 |
| 4,228,062 | 10/1980 | Lee et al. | 525/286 |
| 4,525,521 | 6/1985 | DenHartog | 525/208 |
| 4,617,367 | 10/1986 | Watanabe et al. | 525/208 |
| 4,816,500 | 3/1989 | Corcoran | 525/208 |
| 4,818,792 | 4/1989 | Martin et al. | 525/286 |

FOREIGN PATENT DOCUMENTS

| | | | |
|---|---|---|---|
| 0179954 | 5/1986 | European Pat. Off. | |
| 2454235 | 11/1974 | Fed. Rep. of Germany. | |
| 2529732 | 7/1975 | Fed. Rep. of Germany. | |
| 3402016 | 7/1985 | Fed. Rep. of Germany. | |
| 51-042318 | 4/1976 | Japan | 525/208 |
| 59-199784 | 11/1984 | Japan | 525/286 |
| 1-139653 | 6/1989 | Japan | 525/208 |
| 1-139655 | 6/1989 | Japan | 525/208 |
| 1313653 | 4/1973 | United Kingdom | 525/208 |
| 2142637 | 1/1985 | United Kingdom | 525/286 |

*Primary Examiner*—Carman J. Seccuro
*Attorney, Agent, or Firm*—Oblon, spivak, McClelland, Maier & Neustadt

[57] ABSTRACT

A) 100 parts by weight of at least one finely divided plastic which consists of
  a) from 30 to 100% by weight of methyl methacrylate (monomer I),
  b) from 0 to 70% by weight of an acrylate of a $C_1$-$C_8$-alkanol or of a methacrylate of a $C_2$-$C_8$-alkanol or of a mixture of these monomers (monomers II),
  c) from 0 to 15% by weight of an $\alpha,\beta$-monoethylenically unsaturated mono- and/or dicarboxylic acid of 3 to 5 carbon atoms (monomers III),
  d) from 0 to 20% by weight of copolymerizable monomers which contain at least one nitrogen base group and/or one hyroxyl group (monomers IV) and
  e) from 0 to 5% by weight of other copolymerizable monomers (monomers V), in polymerized form,
B) from 30 to 300 parts by weight of at least one polymer which consists of
  a) from 5 to 100% by weight of glycidyl acrylate and/or methacrylate (monomers VI),
  b) from 0 to 95% by weight of an acrylate or methacrylate of a $C_1$-$C_8$-alkanol or of a mixture of these monomers (monomers VII) and
  c) from 0 to 30% by weight of other copolymerizable monomers (monomers VIII), in polymerized form,
C) from 0 to 300 parts by weight of one or more inert fillers and
D) from 0 to 50 parts by weight of one or more adhesion-improviding agents.

5 Claims, No Drawings

NONAQUEOUS PLASTICS FORMULATIONS

The present invention relates to nonaqueous plastics formulations, essentially containing A) 100 parts by weight of at least one finely divided plastic which consists of
   a) from 30 to 100% by weight of methyl methacrylate (monomer I),
   b) from 0 to 70% by weight of an acrylate of a $C_1$-$C_8$-alkanol or of a methacrylate of a $C_2$-$C_8$-alkanol or of a mixture of these monomers (monomers II),
   c) from 0 to 15% by weight of an $\alpha,\beta$-monoethylenically unsaturated mono- and/or dicarboxylic acid of 3 to 5 carbon atoms (monomers III),
   d) from 0 to 20% by weight of copolymerizable monomers which contain at least one nitrogen base group and/or one hydroxyl group (monomers IV) and
   e) from 0 to 5% by weight of other copolymerizable monomers (monomers V), in polymerized form,
B) from 30 to 300 parts by weight of at least one polymer which consists of
   a) from 5 to 100% by weight of glycidyl acrylate and/or methacrylate (monomers VI),
   b) from 0 to 95% by weight of an acrylate or methacrylate of a $C_1$-$C_8$-alkanol or of a mixture of these monomers (monomers VII) and
   c) from 0 to 30% by weight of other copolymerizable monomers (monomers VIII), in polymerized form,
C) from 0 to 300 parts by weight of one or more inert fillers and
D) from b 0 to 50 parts by weight of one or more adhesion-improving agents.

The present invention furthermore relates to the use of these formulations as adhesive, sealing and coating materials.

DE-B 24 54 235 discloses nonaqueous plastics formulations which contain, as base polymers, finely divided homopolymers of methyl methacrylate or copolymers of this monomer with $C_1$-$C_{10}$-alkyl acrylates and/or $C_2$-$C_{10}$-alkyl methacrylates and, as an organic liquid, phthalates, phosphoric esters, glycolates, high-boiling alkylaryl hydrocarbons or ether compounds. These plastics formulations have the properties of plastisols, ie. they behave like a pasty, relatively easily brushable dispersion in the cold state but gel to form a viscous rubber-like material when heated. Because of this property, the plastisols are used as adhesive, sealing and coating materials. DE-B 24 54 235 and DE-B 25 29 732 furthermore disclose that the adhesive power of these plastics materials can be improved by copolymerizing in the base polymers minor amounts of monomers having free carboxyl, hydroxyl, epoxide, amino or heterocyclic groups containing at least one N atom in the ring, and-/or by adding suitable adhesion promoters to these plastics materials, but the adhesive power of these plastics materials are also not completely satisfactory in the solidified state on metallic substrates.

It is an object of the present invention to overcome this disadvantage by means of more suitable nonaqueous plastics formulations.

We have found that this object is achieved by the plastics formulations described at the outset, which are in the form of plastisols.

Suitable finely divided plastics A) are both homopolymers and copolymers of methyl methacrylate. Preferably used copolymers are those which are composed of from 50 to 90% by weight of methyl methacrylate. Particularly suitable comonomers are the monomers II, the esters of acrylic or methacrylic acid which are derived from the alkanols ethanol, isopropanol, n-butanol, isobutanol, n-hexanol and 2-ethylhexanol and, in the case of acrylic acid, from methanol being preferably copolymerized. Particularly preferred monomers II are methyl acrylate, ethyl acrylate and 2-ethylhexyl acrylate.

Component A) advantageously also contains, as copolymerized units, the monomers III and IV which carry free functional groups. Preferred monomers III are acrylic, methacrylic and itaconic acid, of which methacrylic acid is particularly preferred. Advantageously incorporated monomers IV are the nitriles and the amides of acrylic and methacrylic acid and the esters of these acids with lower aliphatic hydroxy- or aminoalcohols, such as hydroxyethyl acrylate, hydroxyethyl methacrylate and N,N-dimethylaminoethyl acrylate. Other suitable monomers IV are vinyl compounds which contain a heterocyclic group having at least one basic nitrogen atom in the ring, such as N- or C-vinyl compounds of imidazole, N-vinylimidazole being particularly preferred.

In addition, component A) may contain minor amounts, ie. up to 5% by weight, of other copolymerizable monomers, such as vinyl esters of $C$-$C_4$-alkanoic acids.

The finely divided polymers A) are preferably prepared by free radical polymerization, suspension and emulsion polymerization being preferred to solution, mass and precipitation polymerization. An aqueous plastics dispersion whose solids content is usually from 30 to 60% by weight is prepared in a particularly advantageous manner by polymerization of the relevant monomers in an aqueous medium under the known conditions of emulsion polymerization in the presence of water-soluble free radical initiators and emulsifiers and in the presence or absence of protective colloids and regulators and further assistants.

The dispersion obtained is then converted into a dry powder in a conventional manner, for example by spray drying, precipitation or freeze drying. The spray drying process is usually preferred in the case of polymers having a glass transition temperature (Tg) above 20° C., while precipitation or freeze drying is advantageous in the case of polymers having a Tg of less than 20° C. By subsequent addition of suitable assistants, such as finely divided silica, the resulting polymer particles can be prevented from sticking to one another in the case of relatively low glass transition temperatures.

Component A) having a mean particle size of from 0.05 to 500 μm (arithmetic mean of the maximum particle diameters), preferably from 0.1 to 20 μm, particularly preferably from 0.5 to 10 μm, is advantageously used. The desired particle size can be controlled by the amount and type of emulsifier, the plastics particles being larger the smaller the amount of emulsifier.

In general, from 1 to 5% by weight, based on the amount of monomers used, of emulsifier are employed.

Emulsifiers which have proven particularly useful are ethoxylated alkylphenols (degree of ethoxylation: 3-30, $C_6$-$C_{10}$-alkyl radical) and/or ethoxylated fatty alcohols (degree of ethoxylation: 5-50, $C_8$-$C_{25}$-alkyl radical), both of which may be sulfated, and the alkali metal salts of the sulfated derivatives.

Particularly suitable water-soluble polymerization initiators are peroxydisulfates, such as ammonium or sodium peroxydisulfate, or combined systems which contain an organic reducing agent and a peroxide, for example formaldehyde sodium sulfoxylate/hydrogen peroxide. Polymers A) which are mainly used are those which have a K value of from 20 to 130, preferably from 30 to 100, in tetrahydrofuran. The K value is a relative viscosity number which is determined similarly to DIN 53,726 at 25° C. Here, the flow velocity of a solution of 0.1 g of polymer per ml of tetrahydrofuran (THF) is measured relative to the flow velocity of pure THF. It characterizes the mean degree of polymerization of the polymer, which can be influenced by controlling the polymerization conditions in a known manner. The polymerization temperature is preferably from 70° to 90° C.

In accordance with the definition, suitable solvating components B) are polymers which contain the esters of glycidol with acrylic or methacrylic acid in pure or mixed form. The monomers VII, in an amount of not more than 95% by weight, may be present as further monomers in B), the esters of acrylic acid or methacrylic acid which are derived from the alkanols methanol, ethanol, n-butanol or 2-ethylhexanol preferably being copolymerized. Component B) may furthermore contain other copolymerizable monomers, such as acrylonitrile, methacrylonitrile, vinyl esters of lower alkanoic acids, the esters of acrylic or methacrylic acid with lower aliphatic hydroxyalcohols and styrene, in amounts of not more than 30% by weight.

Of particular interest are polymers B) which contain the esters of glycidol with acrylic or methacrylic acid in amounts of from 20 to 60% by weight. The amount of the monomers VII is preferably from 30 to 80% by weight. The K value of B) in THF should be from 8 to 30, preferably from 8 to 18.

The preparation is advantageously carried out in a conventional manner by free radical polymerization of the particular monomers in the absence of a solvent or in solution, in the presence of mercapto-containing molecular weight regulators, such as 2-mercaptoethanol, ethanethiol, dodecanethiol, thiophenol, thioglycerol or esters of thioglycollic acid. Preferred solvents are aromatic hydrocarbons, such as toluene or xylenes. In general, polymerization is carried out with refluxing of the solvent. Initiators which have proven particularly useful are organic peroxides, such as tert-butyl perbenzoate or dilauryl peroxide. The unconverted monomers and, where relevant, the solvent are separated off from the liquid polymers after polymerization is complete, for example by evaporation under reduced pressure.

In addition to the obligatory components A) and B), fillers C) and adhesion-improving agents D) may be added as assistants to the novel plastics formulations.

The fillers serve primarily for increasing the viscosity and improving the abrasion resistance. Examples of suitable fillers are aluminum silicates, quartz, precipitated or pyrogenic silica, gypsum, barite, talc, dolomite, calcium carbonate, carbon black and color-imparting pigments. In general, the fillers are added in a finely divided form. The mean particle size, as the arithmetic mean of the maximum diameters in each case, is preferably from 0.5 to 200 µm. As a rule, however, filler-free plastics formulations are preferred.

Examples of adhesion-improving agents D) are triethylene glycol dimethacrylate and trimethylol trimethacrylate in combination with peroxides, and liquid or solid phenol or resorcinol resins having a low formaldehyde content and aminosilanes or polybasic carboxylic acids, such as maleic acid or itaconic acid. The novel plastics formulations may additionally contain minor amounts of viscosity regulators, suspending agents, flow improvers, fragrance materials, wetting agents or other assistants usually used in coating technology.

The ready-to-use formulations are advantageously prepared from the various components A) to D) and, if required, further assistants by stirring the other starting components into the liquid component B). The resulting nonaqueous plastics formulations are liquid to pasty plastisols which solidify on heating. Depending on the composition of the plastics formulations, temperatures of from 60° to 240° C. are required for this purpose. The required solidification time is from 2 minutes to 2 hours. Usually, plastics formulations which contain components A) having a low Tg require relatively low solidification temperatures and short solidification times, while components A) having a high Tg require high solidification temperatures and long solidification times. As a rule, an increase in the adhesive power is also observed with increasing solidification. At room temperature, curing of the novel plastics formulations usually occurs so slowly that as a rule the shelf life is sufficient for practical applications. The two essential components A) and B) are readily compatible with one another, ie. the gelled plastisols are usually homogeneous materials from which there is virtually no exudation of the component B) (blotting paper test).

The novel plastisols have high adhesive power in the gelled state, particularly on metallic substrates, and are preferably used as adhesive, sealing and coating materials. They are particularly suitable for adhesively bonding and coating metals and are advantageously employed as underbody protection and for sealing weld seams in the automotive sector. Another typical use is the impregnating and coating of textile fabrics, floor coverings or substrates of imitation leather. The plastics formulations can be applied, for example, by means of a trowel or brush, by spraying on with a paint gun or by knife coating, calendering, casting or immersion. The heat required for curing can be supplied, for example, by means of hot air or by exposure to infrared radiation.

EXAMPLES

Example 1

Preparation of various emulsion polymers A)
General method
A mixture of
245 g of water
50 g of monomer mixture A
0.6 g of ammonium peroxydisulfate and
0.5 g of emulsifier (Na salt of ethoxylated (degree of ethoxylation: 25) and sulfated p-isooctylphenol) was heated to 85° C. and, after 15 minutes, an emulsion of
240 g of water
450 g of monomer mixture A and
5 g of emulsifier
was added in the course of 2.5 hours at this temperature while stirring, and at the same time, in a separate feed, a solution of
2.4 g of ammonium peroxydisulfate in
80 g of water
was added.

Thereafter, polymerization was continued for a further hour. The resulting plastics dispersion was then converted by spray drying into a finely divided powder, whose mean particle size was from 1 to 50 μm in all cases. The composition of the resulting polymers A1 to A23 and the associated K values are shown in Table 1.

TABLE 1

| % by weight of monomer | Emulsion polymers A) | | | | | | | | | | | | | | | | | | | | | | |
|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Methyl methacrylate | 100 | 90 | 80 | 70 | 60 | 70 | 70 | 85 | 80 | 78 | 76 | 72 | 67 | 80 | 78 | 79 | 84 | 76 | 66 | 56 | 76 | 61 | 76 |
| Ethyl acrylate | | | 20 | | 40 | | | | 18 | 18 | 18 | 18 | 18 | 18 | 18 | 20 | | 18 | 28 | 38 | 22 | 18 | 18 |
| Methyl acrylate | | | | | | 30 | | | | | | | | | | | | | | | | | |
| n-Butyl methacrylate | | | | | | | 30 | 15 | | | | | | | | | 15 | | | | | | |
| 2-Ethylhexyl acrylate | | 10 | | 30 | | | | | | | | | | | | | | | | | | | |
| Methacrylic acid | | | | | | | | | 2 | 4 | 6 | 10 | 15 | | | | | | | | | | |
| Methacrylamide | | | | | | | | | | | | | | 2 | 4 | | | | | | | | |
| N,N'-Dimethylaminoethyl acrylate | | | | | | | | | | | | | | | | 1 | | 3 | 3 | 3 | 1 | 3 | |
| Hydroxyethyl acrylate | | | | | | | | | | | | | | | | | | 3 | 3 | 3 | 1 | | 3 |
| Hydroxyethyl methacrylate | | | | | | | | | | | | | | | | | | | | | | 18 | |
| N-Vinylimidazole | | | | | | | | | | | | | | | | | 1 | | | | | | 3 |
| K value | 44 | 55 | 61 | 58 | 61 | 65 | 60 | 67 | 55 | 56 | 58 | 61 | 64 | 56 | 57 | 73 | 66 | 49 | 50 | 49 | 94 | 80 | 52 |

Example 2

Preparation of various solution polymers B

General method

A mixture of 525 g of monomer B and 75 g of a molecular weight regulator was added to 100 g of toluene under reflux in the course of 2.5 hours, and at the same time, in a separate feed, a solution of 10 g of tert-butyl perbenzoate in 100 g of toluene was added. Thereafter, polymerization was continued for a further 30 minutes. The solvent and the residual monomers were then removed by evaporation under reduced pressure to a residual content of less than 0.1% by weight. The composition of the resulting liquid polymers B1) to B19) and the associated K values are shown in Table 2.

TABLE 2

| Monomers and regulators (% by weight) | Emulsion polymers B) | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| Glycidyl methacrylate | 50 | 38 | 25 | 13 | 38 | 63 | 50 | 38 | 25 | 13 | 5 | 38 | 38 | 45 | 48 | 28 | 38 | 38 | 40 |
| Ethyl acrylate | 43 | 55 | 68 | 80 | 46 | | | | | | | | | | | | | | |
| n-Butyl acrylate | | | | | | 30 | 43 | 55 | 68 | 80 | 88 | 55 | 55 | 50 | 50 | | 42 | 48 | 40 |
| n-Butyl methacrylate | | | | | | | | | | | | | | | | 65 | | | |
| Acrylonitrile | | | | | | | | | | | | | | | | | | 14 | 8 |
| Hydroxyethyl acrylate | | | | | | | | | | | | | | | | | | | |
| Thiophenol | | | | | | | | | | | 7 | | | | | | | | |
| Thioglycerol | | | | | | | | | | | | 7 | | | | | | | |
| 2-Mercaptoethanol | 7 | 7 | 7 | 7 | 16 | 7 | 7 | 7 | 7 | 7 | | | 7 | 5 | 2 | 7 | 6 | 6 | |
| K value | 10 | 10 | 10 | 9 | 10 | 11 | 10 | 10 | 10 | | 9 | 12 | 12 | 12 | 10 | 18 | 10 | 11 | 11 |

EXAMPLE 3

Investigation of the compatibility of components A) and B) in various plastics formulations 10 g of an emulsion polymer A) from Example 1 was stirred into 10 g of a solution polymer B) from Example 2. Plastics films having a width of 100 mm and a film thickness of 2 mm were then prepared from the resulting plastics formulations at 130° C by pressing for 10 minutes. After 8 days (standard conditions of temperature and humidity), the dryness and tack of the film surface were checked with the aid of blotting paper, and the compatibility of the starting components was then evaluated qualitatively. In addition, the ultimate tensile strength (the tensile stress at the moment of breaking) according to DIN 53,455 and the elongation at break (the length at the moment of breaking relative to the original measured length of the test specimen, No. 3 according to DIN 53,455) were determined. The test speed was 100 mm/min. Plastics formulations which had a weight ratio of A) to B) of 1.5 1 or 2 1 were prepared and investigated in the same manner. The results are shown in Table 3.

TABLE 3

| Composition | Tensile strength [N/mm$^2$] | Elongation at break [%] | Compatibility |
|---|---|---|---|
| A:B = 1:1 | | | |
| A1/B8 | 5.1 | 80 | Satisfactory |
| A3/B8 | 3.9 | 290 | Very good |
| A9/B8 | 3.1 | 152 | Very good |
| A10/B8 | 7 | 106 | Very good |
| A11/B8 | 6.1 | 67 | Very good |
| A12/B8 | 10.8 | 26 | Good |
| A13/B8 | 13.7 | 1 | Adequate |
| A9/B9 | 4.9 | 148 | Good |
| A10/B9 | 5.8 | 97 | Satisfactory |
| A11/B9 | 5.1 | 38 | Adequate |
| A16/B8 | 4 | 315 | Very good |
| A6/B9 | 3.7 | 260 | Satisfactory |
| A19/B8 | 0.6 | 127 | Very good |
| A20/B8 | 0.5 | 140 | Very good |

TABLE 3-continued

| Composition | Tensile strength [N/mm²] | Elongation at break [%] | Compatibility |
|---|---|---|---|
| A21/B6 | 4.5 | 380 | Very good |
| A14/B8 | 4.7 | 243 | Very good |
| A15/B8 | 4.5 | 211 | Very good |
| A22/B8 | 7.1 | 124 | Satisfactory |
| A7/B8 | 5.1 | 256 | Very good |
| A4/B8 | 1.3 | 418 | Very good |
| A2/B8 | 4 | 153 | Very good |
| A18/B5 | 4.7 | 114 | Very good |
| A18/B12 | 1.6 | 147 | Very good |
| A18/B13 | 4.2 | 12 | Satisfactory |
| A18/B17 | 5.1 | 17.2 | Very good |
| A18/B18 | 6 | 46 | Very good |
| A18/B19 | 6.4 | 23 | Satisfactory |
| A18/B6 | 11.2 | 51 | Very good |
| A18/B7 | 5 | 150 | Very good |
| A18/B8 | 3.2 | 195 | Very good |
| A18/B9 | 2.2 | 236 | Good |
| A18/B10 | 2 | 203 | Satisfactory |
| A18/B11 | 1.5 | 50 | Adequate |
| A18/B1 | 7 | 168 | Very good |
| A18/B2 | 3.1 | 219 | Very good |
| A18/B3 | 2.7 | 200 | Good |
| A18/B4 | 1.6 | 205 | Good |
| A18/B16 | 6.5 | 110 | Good |
| A18/B14 | 4.3 | 49 | Very good |
| A18/B15 | 3.6 | 75 | Good |
| A:B = 1.5:1 | | | |
| A18/B7 | 10.1 | 107 | Very good |
| A18/B8 | 8.1 | 151 | Very good |
| A18/B9 | 4.1 | 146 | Very good |
| A18/B10 | 3.7 | 97 | Good |
| A18/B11 | 2.9 | 56 | Satisfactory |
| A18/B1 | 12.6 | 100 | Very good |
| A18/B2 | 7.6 | 211 | Very good |
| A18/B3 | 4.6 | 109 | Good |
| A18/B4 | 4.8 | 133 | Satisfactory |
| A18/B15 | 6.4 | 18 | Good |
| A:B = 2:1 | | | |
| A18/B9 | 7.7 | 147 | Very good |
| A18/B10 | 5.7 | 56 | Very good |
| A18/B11 | 5.5 | 47 | Satisfactory |

Example 4

Determination of the adhesive strength of various adhesive bonds with metal.

Two strips of V2A stainless steel were adhesively bonded to one another using various plastics formulations which contained the particular components A) and B) in a weight ratio of 1:1 (area bonded 3 cm², layer thickness in nonsolidified state 0.18-0.64 mm). The solidification time was from 30 minutes to 1.5 hours and the solidification temperatures were 120° C., 160° C. or 180° C. The adhesive strength (maximum force in N/mm²) was then determined according to DIN 53,283 using a tensile test machine (advance rate 5 mm/min). The results are shown in Table 4. In all cases, a loss of adhesion was observed. The comparative experiments (V1 to V3) relate to Example 1 of DE-B 25 29 732 and contain, as component B), dibenzyltoluene or a mixture of 99% by weight of dibenzyltoluene in 1% by weight of maleic acid. The mean particle size of the emulsion polymers A8) and A17 was 2.1 μm.

TABLE 4

| Composition | Layer thickness (mm) | Solidification conditions (Time/temperature) | Adhesive strength (N/mm²) |
|---|---|---|---|
| A8/B7 | 0.30 | 30 min/120 | 1.0 |
| A8/B7 | 0.30 | 30 min/160 | 1.9 |
| A8/B7 | 0.30 | 30 min/180 | 4.1 |
| A8/Dibenzyltoluene (V1) | 0.30 | 30 min/120 | No adhesive bond |
| A8/Dibenzyltoluene (V1) | 0.30 | 30 min/160 | No adhesive bond |
| A8/Dibenzyltoluene (V1) | 0.30 | 30 min/180 | No adhesive bond |
| A17/Dibenzyltoluene (V2) | 0.30 | 30 min/120 | 0.9 |
| A17/Dibenzyltoluene (V2) | 0.30 | 30 min/160 | 1.0 |
| A17/Dibenzyltoluene (V2) | 0.30 | 30 min/180 | 1.2 |
| A17/Dibenzyltoluene + maleic acid (V3) | 0.30 | 30 min/120 | 1.2 |
| A17/Dibenzyltoluene + maleic acid (V3) | 0.30 | 30 min/160 | 1.6 |
| A17/Dibenzyltoluene + maleic acid (V3) | 0.30 | 30 min/180 | 2.1 |
| A3/B7 | 0.30 | 30 min/180 | 4.0 |
| A16/B7 | 0.30 | 30 min/180 | 4.6 |
| A23/B7 | 0.30 | 30 min/180 | 5.5 |
| A9/B8 | 0.33 | 1 h/180 | 6.3 |
| A18/B6 | 0.64 | 2 h/180 | 16.0 |
| A18/B8 | 0.18 | 1.5 h/180 | 16.1 |
| A18/B2 | 0.37 | 1.5 h/180 | 14.2 |

We claim:

1. A nonaqueous plastics formulation free of any added solvent, consisting essentially of:
   A) 100 parts by weight of at least one finely divided solid plastic which consists of
      a) from 30 to 99% by weight of methyl methacrylate (monomer I),
      b) from 0 to 70% by weight of an acrylate of a $C_1$-$C_8$-alkanol or of a methacrylate of a $C_2$-$C_8$-alkanol or of a mixture of these monomers (monomers II),
      c) from 0 to 15% by weight of an $\alpha,\beta$-monoethylenically unsaturated mono- and/or dicarboxylic acid of 3 to 5 carbon atoms (monomers III),
      d) from 0 to 20% by weight of copolymerizable monomers which contain at least one nitrogen base group and/or one hydroxyl group (monomers IV) and
      e) from 0 to 5% by weight of other copolymerizable monomers (monomers V),
      provided that the solid plastic is of at least 2% by weight of monomers III and/or of at least 1% by weight of monomer IV, in polymerized form,
   B) from 30 to 300 parts by weight of at least one fluid polymer which consists of
      a) from 5 to 100% by weight of glycidyl acrylate and/or methacrylate (monomers VI),
      b) from 0 to 95% by weight of an acrylate or methacrylate of a $C_1$-$C_8$-alkanol or of a mixture of these monomers (monomers VII) and
      c) from 0 to 30% by weight of other copolymerizable monomers (monomers VIII), in polymerized form,
   C) from 0 to 300 parts by weight of one or more inert fillers and
   D) from 0 to 50 parts by weight of one or more adhesion-improving agents.

2. A plastics formulation as claimed in claim 1, containing, as component B), a copolymer which is composed of from 20 to 60% by weight of the monomers VI.

3. A plastics formulation as claimed in claim 1, containing, as component B), a copolymer which is composed of from 30 to 80% by weight of the monomers VII.

4. A plastics formulation as claimed in claim 1, containing, as component A), a finely divided plastic which has a K value of from 20 to 130 in tetrahydrofuran.

5. A plastics formulation as claimed in claim 1, containing, as component B), a copolymer which has a K value of from 8 to 30 in tetrahydrofuran.

* * * * *